United States Patent Office 3,045,006
Patented July 17, 1962

3,045,006
PREPARATION OF CELLULOSE DERIVATIVES
René Camille Gerbaux, Edegem-Antwerp, José Thérèse Lemmerling, Wilrijk-Antwerp, and Frans Alfons Claes, Heultje, Westerlo, Belgium, assignors to Gevaert Photo-Producten N.V., Mortsel-Antwerp, Belgium, a Belgian company
No Drawing. Filed Aug. 15, 1960, Ser. No. 49,454
Claims priority, application Belgium Aug. 19, 1959
3 Claims. (Cl. 260—224)

This invention relates to the preparation of mixed cellulose esters of sulfuric acid and of lower fatty acids, and more particularly to further esterifying cellulose sulfate with lower fatty acid anhydrides.

The different methods of preparing mixed cellulose esters can be classified into two main groups according to the basic product used, one group starting from pure cellulose, the other from a cellulose derivative, containing already one of the substituents of the mixed ester to be prepared.

It is known to prepare mixed esters of cellulose acylate sulfate starting from cellulose whereby the cellulose is reacted with a mixture of sulfuric acid and of a lower fatty acid anhydride.

An object of the present invention is a method for the preparation of fibrous cellulose acylate sulfate starting from cellulose sulfate.

Another object of the present invention is a method for the preparation of fibrous cellulose acylate sulfate starting from cellulose sulfate in which a non-solvent for the cellulose acylate sulfate to be obtained is used.

A still further object of the present invention is the preparation of fibrous cellulose acylate sulfate in which the ratio of the substitution by acylate and by sulfate groups can be determined in advance.

We have found that on preparing mixed cellulose esters of sulfuric acid and of lower fatty acids it is advantageous to use cellulose sulfate as the starting material. By reacting the cellulose sulfate with a lower fatty acid anhydride the corresponding mixed cellulose ester is obtained.

The cellulose sulfate can be prepared according to one of the methods known in the prior art for example the method described in the Belgian Patent 553,396 (filed August 19, 1959), according to which a fibrous product is made.

To preserve the fibrous structure of the starting material during and after the acylation, solvents for the acylating mixture are used. However, only solvents in which the cellulose acylate sulfate remains insoluble should be used. Moreover, this invention simplifies further finishing steps such as the washing of the product thus obtained and the stabilization of the bound mono-sulfate groups by neutralization of the remaining free acid groups.

As solvents for the method according to the present invention can be cited e.g. aromatic or aliphatic hydrocarbons such as benzene, toluene, xylene, heptane, petroleum ether; mixtures of hydrocarbons normally commercially available such as petroleum; chlorinated hydrocarbons such as carbotetrachloride; ethers such as diethyl ether, etc.

In the further description of the present invention these solvents will be referred to as "non-solvents" because of the fact that they are not solvents for the cellulose acylate sulfate which is to be obtained.

It is a particular advantage of the method according to the present invention that the degree of substitution and the ratio between the sulfate groups and the acylate groups which are to be substituted on the cellulose chain can be determined in advance by the choice of the starting cellulose sulfate.

Furthermore it is possible to obtain with differently substituted cellulose sulfates mixed esters which have the same degree of substitution. This is possible by changing the different reaction circumstances, such as the constituents of the reaction mixture, the temperature and the duration of the reaction itself.

When using e.g. as starting material a cellulose sulfate having a degree of substitution (hereinafter indicated by the abbreviation D.S.) of bound mono-sulfate groups of 0.4, it is possible to obtain a cellulose acetate sulfate with 0.2 sulfate groups and a D.S. of acetyl groups varying between 1.7 and 2.8. Still with the same cellulose sulfate as starting material it is possible to obtain according to the reaction circumstances a cellulose acetate sulfate with a D.S. of 0.8 sulfate groups and a D.S. of acetyl groups varying between 1 and 2.1. Any possible D.S. between the foregoing extreme values can be realized. Starting from another cellulose sulfate an extensive series of different products can likewise be obtained. In connection herewith we should not forget that cellulose sulfates having a D.S. of sulfate up to and including 2 can be synthesized.

The circumstances which influence the course of the reaction may vary within a relatively wide range. The temperature of the reaction may be located between −10 and +45° C. and it is also possible to have the reaction taking place partially at low temperatures and partially at high temperatures. The composition of the acylating mixture includes a wide range of possibilities with regard to the ratios of the non-solvent, the lower fatty acid anhydride and the lower fatty acid and the quantity of catalyst present. For example the quantity of reactants present in the reaction mixture may vary between 30 and 70 parts of non-solvent; between 15 and 50 parts of acid anhydride; between 10 and 40 parts of acid and between 0 and 3 parts of catalyst per part of cellulose sulfate. The quantity of acylating mixture varies between 10 and 50 parts per part of cellulose sulfate and is determined in function of the apparatus used and of the final product to be obtained.

The choice of the reaction circumstances influences not only the chemical composition of the product obtained but also its physico-chemical properties, such as the viscosity.

From the foregoing results clearly that, due to the possibilities offered by the reaction and the influencing circumstances of same, a final product with a well determined composition can be obtained by different ways. In consequence thereof it becomes possible to determine the optimal circumstances which lead to the proposed end product. For example the content of free sulfuric acid in the acylating mixture can strongly be lowered.

The examples hereinafter only deal with the preparation of cellulose acetate sulfate. However, the present invention is not meant to be limited to the preparation of this mixed ester alone, but it relates also to the preparation of mixed cellulose esters of sulfuric acid and other lower fatty acids.

*Example 1*

20 parts of fibrous cellulose sulfate in its free acid form with a D.S. of 0.35 sulfate groups are added at a temperature not higher than 5° C. to a previously prepared mixture composed of 108 parts by weight of acetic anhydride, 63 parts of acetic acid and 170 parts of diethyl ether to which 8 parts of sulfuric acid were added. The reaction is continued for 3 hours at 5° C. whilst moderately stirring. The liquid is decanted. The product is washed with ether and poured into a 2% solution of sodium acetate in alcohol of 85%. Finally a 2% sodium carbonate solution is added to neutralize the reaction medium. After sucking off, rinsing and drying, a product is obtained which has a D.S. of 1.85 acetyl groups and of 0.85 monosulfate groups.

*Example 2*

Fibrous cellulose sulfate with a D.S. of 0.35 sulfate groups is treated as described in Example 1 with the same acetylating mixture but containing only 4 parts of sulfuric acid. After 3 hours of reaction at 5° C. and after application to the product of same after-treatment a cellulose acetate sulfate is obtained having a D.S. of 1.8 acetyl groups and a D.S. of 0.4 sulfate groups.

*Example 3*

In the same way as in Example 1, a fibrous cellulose sulfate having a D.S. of 0.35 sulfate groups is treated with the same acetylating mixture containing the same quantity of catalyst. However, the reaction circumstances are as follows:

(1) After 2 hours of reaction at 5° C. and 2 hours at 15° C. a product is obtained which has a D.S. of 1.9 acetyl groups and a D.S. of 0.6 sulfate groups.

(2) When the reaction mass is kept for 2 hours at 5° C. and thereafter for 2 hours at 20° C., a product is obtained which has a D.S. of 2.2 acetyl groups and a D.S. of 0.4 sulfate groups.

(3) After reaction for 2 hours at 5° C. and for 2 hours at 30° C. a product is obtained having a D.S. of 2.25 acetyl groups and of 0.3 sulfate groups.

*Example 4*

The same treatment as described in the first example is applied to fibrous cellulose sulfate having a D.S. of 0.35 sulfate groups, but only 2 parts of sulfuric acid are added instead of 8 parts. The reaction is continued for 3 hours at 5° C., and the product obtained receives the same after-treatment as described in the first example. A cellulose acetate sulfate with a D.S. of 1.9 acetyl groups and of 0.3 sulfate groups is obtained.

*Example 5*

As starting material is used a fibrous cellulose sulfate of a D.S. of 0.75 sulfate groups together with the same reaction mixture of the first example, however, without catalyst. After 4 hours of reaction at 5° C. a product with a D.S. of 0.2 acetyl groups and of 0.4 sulfate groups is obtained.

Due to the water-solubility of the cellulose acylate sulfates obtained according to the invention, the product can be used in the manufacture of different photographic layers such as for instance antihalo-layers and filter layers.

We claim:

1. Process for the manufacture of mixed fibrous cellulose esters of sulfuric acid and of lower fatty acids comprising the steps of treating fibrous cellulose sulfate with an acylating mixture composed of a lower fatty acid anhydride, a lower fatty acid and a solvent for the reaction mixture wherein the cellulose acylate sulfate remains insoluble, washing and drying the cellulose acylate sulfate obtained.

2. Process for the manufacture of mixed fibrous cellulose esters of sulfuric acid and of lower fatty acids according to claim 1 wherein the lower fatty acid anhydride is acetic anhydride.

3. Process for the manufacture of mixed fibrous cellulose esters of sulfuric acid and of lower fatty acids according to claim 2 wherein the treatment with the acetylating mixture is continued at temperatures between −10 and +45° C. as long as necessary to obtain the desired ratio of sulfate and of acetyl-groups in the cellulose acetate sulfate.

References Cited in the file of this patent
UNITED STATES PATENTS 2,143,332    Sindl et al. _____ Jan. 10, 1939